June 11, 1957 T. C. EDWARDS ET AL 2,795,240
SEWER INLET
Filed Dec. 6 1954
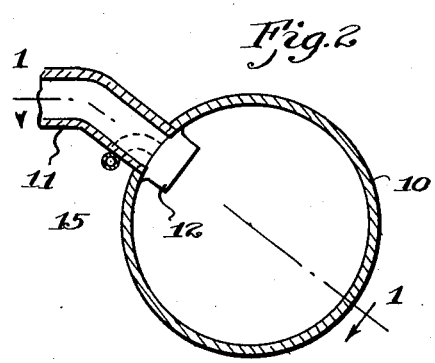
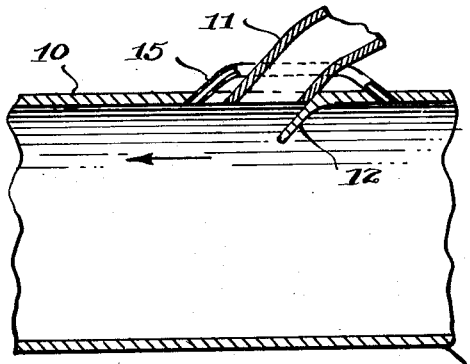
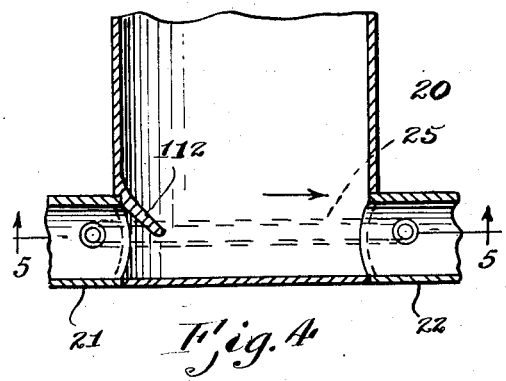
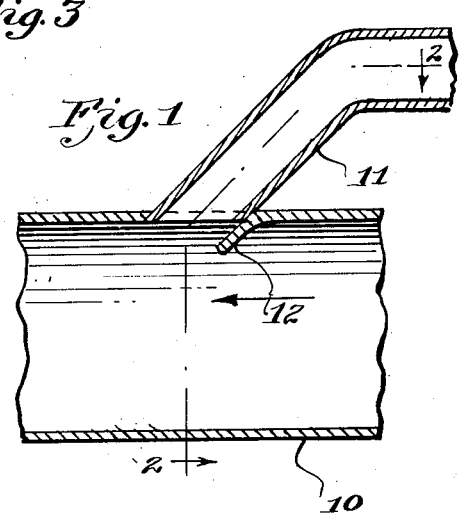
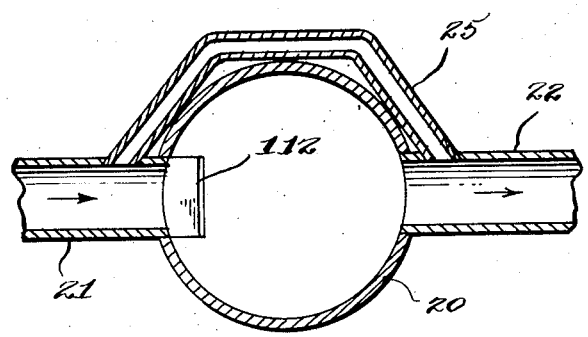
INVENTORS
Thomas C. Edwards
BY Charles G. Roberts
Hauke & Hardesty
Attorneys.

United States Patent Office 2,795,240
Patented June 11, 1957

2,795,240

SEWER INLET

Thomas C. Edwards, Clawson, and Charles G. Roberts, Detroit, Mich.

Application December 6, 1954, Serial No. 473,124

2 Claims. (Cl. 138—39)

The present invention relates to sewer inlet and has among its objects the provision of means for increasing the capacity of sewer systems for the handling of flood water.

Another object is to provide means for increasing the flow from lateral conduits, thereby preventing the backing up of the water and sewage into the places served by such lateral conduits.

Still other objects will readily occur to those skilled in the art upon reference to the following description and the accompanying drawings in which Fig. 1 is a section on line 1—1 of Fig. 2, showing a junction between a sewer main conduit and a lateral conduit.

Fig. 2 is a section on line 2—2 of Fig. 1.

Fig. 3 is a view similar to Fig. 1 but showing a modification.

Fig. 4 is a vertical central section of a sewer main conduit and manhole well.

Fig. 5 is a horizontal section of the same on line 5—5 of Fig. 4.

In the normal operation of a conventional sewer system the main conduits and lateral conduits usually carry off the sewage flow without difficulty and without the various conduits operating at more than about half of their capacity.

However, under extraordinary conditions it often happens that the main conduits receive so great an influx that they become completely filled and consequently there is a backing up of the water and sewage in the lateral conduits and into homes or other places normally drained.

The present invention is intended to eliminate such backing up by causing the flow in the main conduit to exert a suction on the lateral conduit and thereby maintain the flow into the main. This effect is produced by deflecting the flow in the main conduit away from the inflowing current from the lateral conduit.

In the drawings, Figs. 1 and 2, a sewer main conduit is indicated at 10 and a lateral conduit at 11, this usually entering the main conduit at an angle causing the inflow in the direction of flow in the main conduit.

In the present invention, immediately ahead of the lateral conduit inlet is fixed a deflector plate 12 extending angularly toward the opposite wall of the main conduit at about the same angle as the lateral conduit. This plate should be of a width at least as great as the diameter of the lateral conduit and of a length—in the direction of the axis of the lateral conduit—about the same as the diameter of the lateral conduit. While the width is preferably about the same as the diameter of the lateral conduit, it may be wider if desired.

As will be noted from Fig. 2, the junction of the lateral conduit 11 with the main conduit 10 is above the horizontal centerline of the main conduit but below the topmost point. Consequently normal flow through the main conduit will not be at sufficiently high level to contact the plate 12. When, however, the flow increases, due to, for example, heavy rainfall, and begins to approach the capacity of the main conduit, the plate 12 will be submerged and will destroy the laminar flow by deflecting some of the current downwardly, away from the incoming lateral flow. This results in a sort of injector action exerting a pull on the content of the lateral conduit. In other words, it produces a low pressure area at the mouth of the lateral conduit.

An additional effect of the same kind may be obtained by the use of the structure shown in Fig. 3. In this form, a small bypass conduit 15 is extended from the area ahead of plate 12 to a point just beyond the lateral inlet. This bypass will prevent any gas accumulation in the pocket ahead of the plate, and in discharging into the main conduit immediately beyond the lateral inlet and angularly into the main conduit, will exert an additional urge to the flow from the lateral conduit.

In Figs. 4 and 5, there are shown the application of a similar deflecting plate to an otherwise conventional manhole well through the bottom of which a sewer main conduit is arranged. In these figures the well of a manhole is shown at 20 having an inlet main conduit 21, an outlet main conduit 22, and a deflector plate 112 arranged angularly over the end of the inlet. In this instance, a bypass 25, corresponding in function to bypass 15, is also arranged.

In this application of the invention, the increased velocity of the flow caused by the venturi action of plate 112 produces a low pressure area above the outflow from the main conduit 21 and tends to prevent a build-up of pressure in the well which frequently results in dislodgement of the manhole cover.

Such a deflector plate may even be used with advantage where the main conduit is an open canal or ditch and the lateral conduit discharges thereinto below the level of flow through the main conduit.

We claim:

1. In a sewer system, a sewer main conduit, a lateral conduit opening thereinto, and a deflector plate arranged within the main conduit adjacent to and in advance of the lateral conduit opening, said plate being inclined in the direction of the normal flow in the main conduit, and projecting toward the opposite wall of the main conduit for a distance equal to substantially the diameter of the lateral conduit opening.

2. In a sewer system, a main conduit, a lateral conduit opening thereinto, and a deflector plate arranged within the main conduit and in advance of the lateral conduit opening, said plate being inclined in the direction of the normal flow in the main conduit and of a width of at least the diameter of the lateral conduit, and projecting toward the opposite wall of the main conduit for a distance equal to substantially the diameter of the lateral conduit opening.

References Cited in the file of this patent

UNITED STATES PATENTS

| 846,600 | Oakes | Mar. 12, 1907 |
| 2,227,716 | Ingham | Jan. 7, 1941 |

FOREIGN PATENTS

| 3,378 | Great Britain | Apr. 14, 1900 |